(12) United States Patent
Tiberghien et al.

(10) Patent No.: US 8,201,853 B2
(45) Date of Patent: Jun. 19, 2012

(54) CLAMPING COUPLING ELEMENT AND A COUPLING INCLUDING SUCH AN ELEMENT

(75) Inventors: Alain-Christophe Tiberghien, Sevrier (FR); Christophe Durieux, Gilly sur Isere (FR); Serafim Marques Barroca, Frontenex (FR)

(73) Assignee: Staubli Faverges, Faverges (FR)

( * ) Notice: Subject to any disclaimer, the term of this patent is extended or adjusted under 35 U.S.C. 154(b) by 411 days.

(21) Appl. No.: 12/458,094

(22) Filed: Jun. 30, 2009

(65) Prior Publication Data

US 2009/0322076 A1 Dec. 31, 2009

(30) Foreign Application Priority Data

Jun. 30, 2008 (FR) ...................................... 0854410

(51) Int. Cl.
*F16L 21/00* (2006.01)
(52) U.S. Cl. ............................ 285/376; 285/84; 285/402
(58) Field of Classification Search .................... 285/84, 285/85, 91, 87, 88, 86, 402, 377, 376
See application file for complete search history.

(56) References Cited

U.S. PATENT DOCUMENTS

| | | | | |
|---|---|---|---|---|
| 69,706 | A * | 10/1867 | Roberts | 285/87 |
| 806,665 | A * | 12/1905 | Henderson et al. | 285/84 |
| 808,008 | A * | 12/1905 | Oagle | 285/88 |
| 828,243 | A * | 8/1906 | Polmann | 285/376 |
| 915,985 | A * | 3/1909 | Medovarski | 285/86 |
| 935,082 | A * | 9/1909 | Anderson | 285/88 |
| 966,925 | A * | 8/1910 | Kittredge | 285/85 |
| 1,029,819 | A * | 6/1912 | Nylander | 285/88 |
| 1,490,771 | A * | 4/1924 | Fortin et al. | 285/376 |
| 1,871,370 | A * | 8/1932 | Jacques | 285/85 |
| 1,885,321 | A * | 11/1932 | Benn | 285/85 |
| 2,248,701 | A * | 7/1941 | Fowler | 285/84 |
| 2,315,981 | A * | 4/1943 | Olson | 285/87 |
| 2,550,421 | A * | 4/1951 | Mueller | 285/376 |
| 2,684,860 | A * | 7/1954 | Rafferty | 285/85 |
| 2,901,258 | A * | 8/1959 | Brandafi | 285/85 |
| 3,455,580 | A * | 7/1969 | Howard | 285/87 |
| 5,397,196 | A * | 3/1995 | Boiret et al. | 285/376 |
| 5,741,084 | A * | 4/1998 | Del Rio et al. | 285/376 |
| 6,905,151 | B2 * | 6/2005 | Froment et al. | 285/376 |
| 7,481,467 | B2 * | 1/2009 | Horimoto et al. | 285/377 |
| 7,731,243 | B2 * | 6/2010 | Tiberghien et al. | 285/402 |

FOREIGN PATENT DOCUMENTS

| | | |
|---|---|---|
| DE | 6750287 | 1/1969 |
| EP | 0374135 | 6/1990 |
| EP | 1862719 | 12/2007 |
| GB | 2109885 | 6/1983 |
| GB | 2156023 | 10/1985 |

* cited by examiner

*Primary Examiner* — David E Bochna
(74) *Attorney, Agent, or Firm* — Dowell & Dowell, PC

(57) ABSTRACT

A female coupling element for releasably joining pipes and which receives a male element along a longitudinal axis thereof, and which includes a body, a locking ring secured in translation relative to the body and provided with at least one slot for receiving at least one radially projecting portion of the male element, and at least one locking notch for receiving the projecting portion in a configuration in which the projecting portion is locked axially along the longitudinal axis, a safety ring superposed, at least in part, on the locking ring, and the safety ring including at least one elastic member that is deformable between a first configuration in which the member prevents the projecting portion of the male element moving out of a locking notch and a second configuration in which the member allows the projecting portion to move from the locking notch.

15 Claims, 5 Drawing Sheets

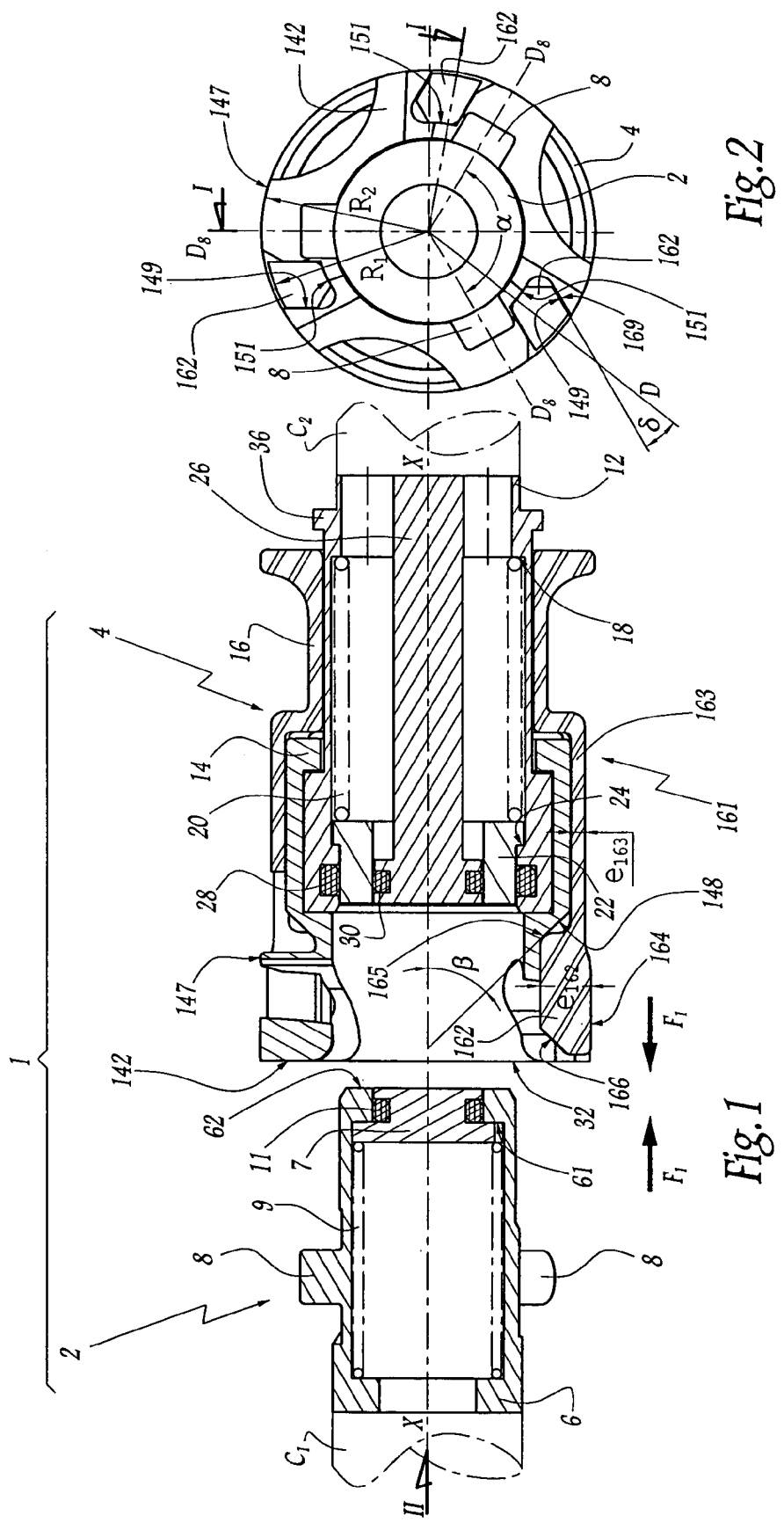

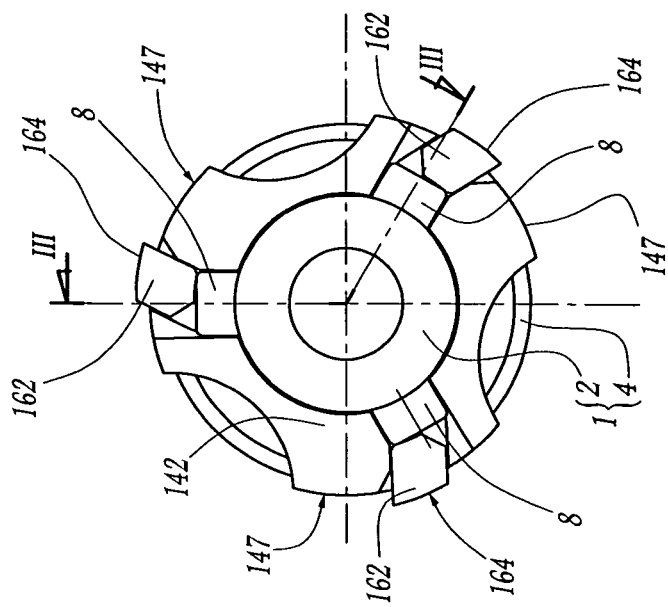
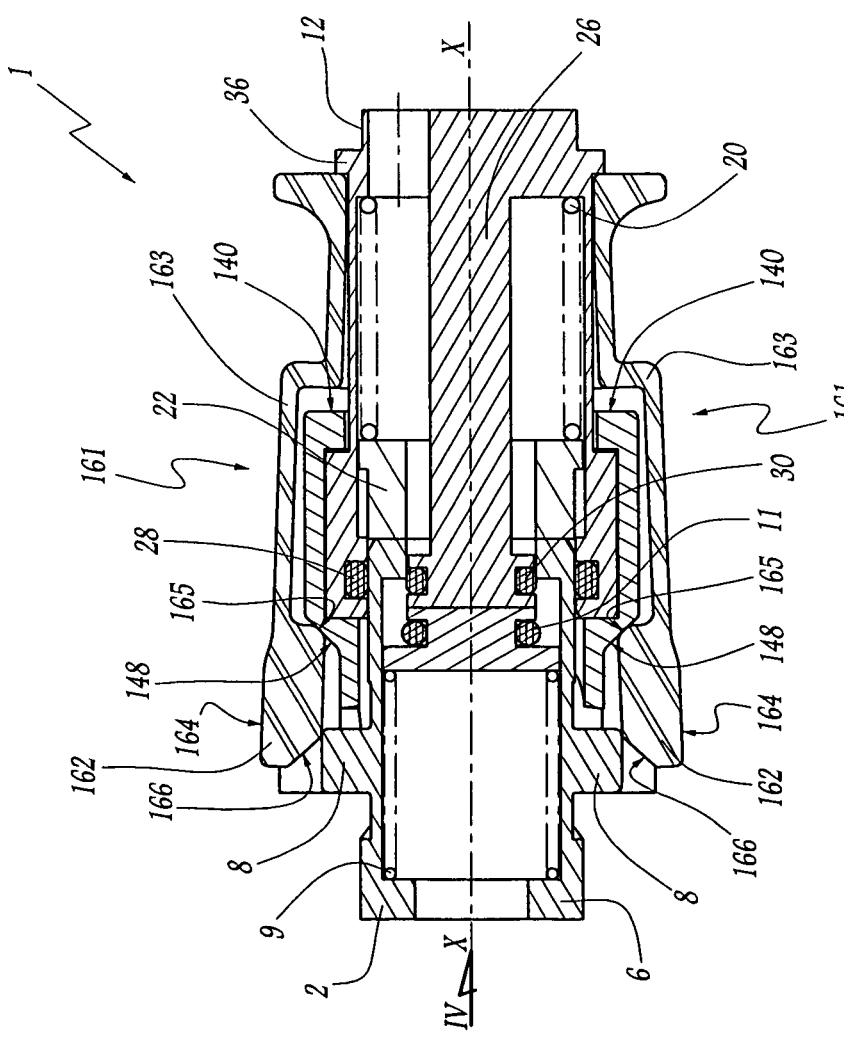

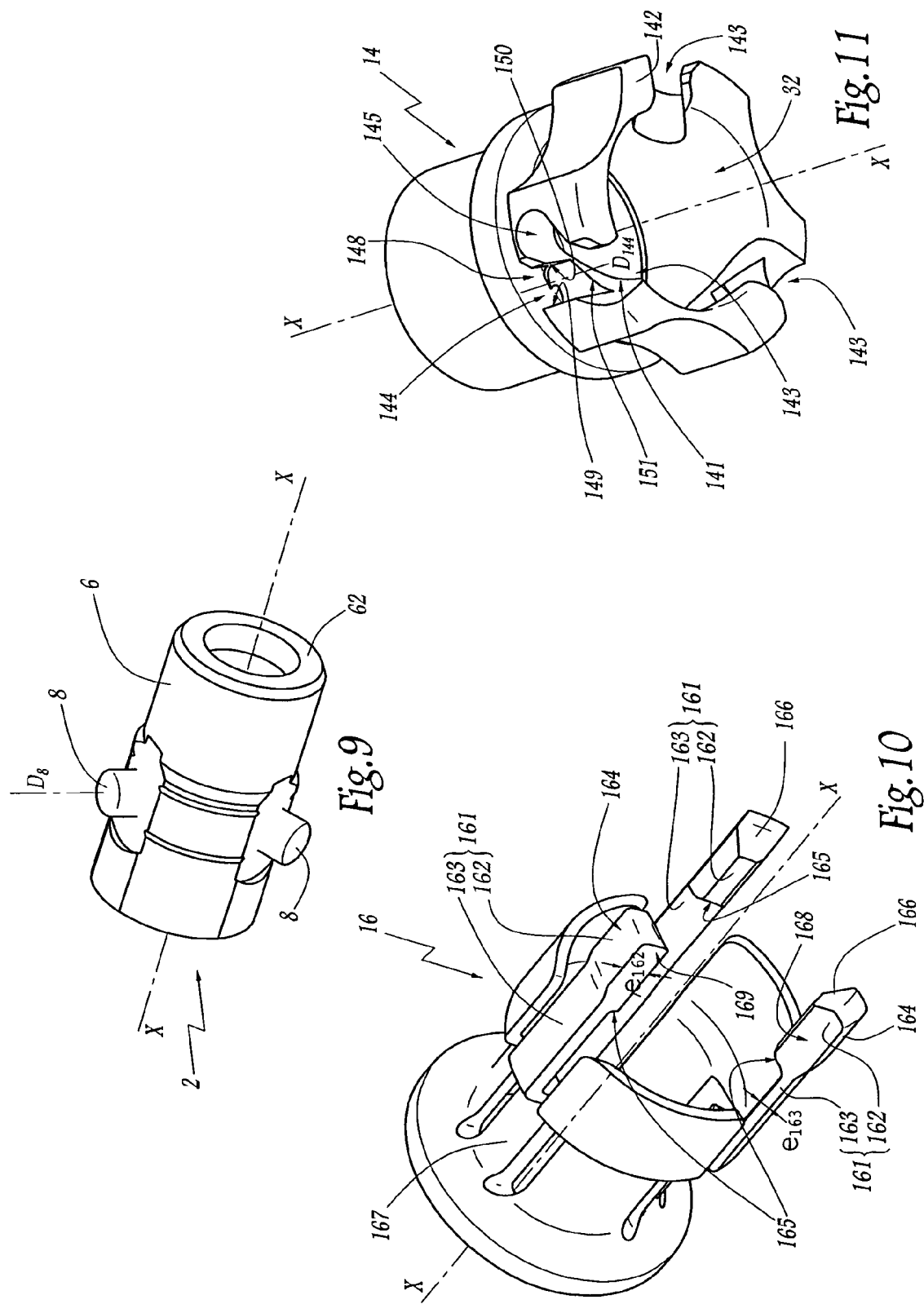

CLAMPING COUPLING ELEMENT AND A COUPLING INCLUDING SUCH AN ELEMENT

BACKGROUND OF THE INVENTION

1. Field of the Invention

The present invention relates to a coupling element and to a coupling for releasably joining together two pipes.

2. Brief Description of the Related Art

FR-A-2 901 595 discloses a female coupling element for receiving a male coupling element. The female element comprises a body, a locking ring mounted about the body, and a safety ring superposed on the locking ring. The movement of projecting locking studs placed on the male element is limited by the safety ring, which is urged to the front of the body by a spring. A function of locking these two elements together is thus obtained in reliable manner.

Nevertheless, in order to provide the safety function, it is necessary to cause a plurality of parts to co-operate. In addition to a solid steel safety ring, that type of coupling element also requires a spring and at least one lug serving to prevent the safety ring from turning.

SUMMARY OF THE INVENTION

The object of the present invention is to provide a coupling element that includes means for providing locking on mutual engagement and means for making the locking safe, which means can be provided in simple manner.

To this end, the invention provides a female coupling element suitable for releasably joining pipes, said element being suitable for receiving a male element along a longitudinal axis of the element, the element comprising:

a body;

a locking ring secured in translation relative to the body and provided with at least one slot suitable for receiving at least one radially-projecting portion of the male element, and at least one locking notch suitable for receiving the projecting portion in a configuration in which said portion is locked axially along the longitudinal axis; and a safety ring superposed at least in part on the locking ring;

the female element being characterized in that the safety ring includes at least one elastically deformable member that is deformable between a first configuration in which the member prevents a projecting portion of the male element passing out of a locking notch, and a second configuration in which the member allows the portion to pass.

By means of the element of the invention, the two coupling elements can be locked to each other reliably, with locking in the connected position taking place automatically and in simplified manner, because of the presence of the elastically-deformable member of the safety ring. This provides a simplified construction for the coupling that is due to the spring and the anti-rotation lugs that are present in the prior art coupling being omitted.

According to other advantageous characteristics of the coupling element in accordance with the invention, taken in isolation or in any technically feasible combination:

the member is elastically deformable between the first configuration and the second configuration by radial deformation;

the safety ring is mounted to slide around the locking ring, and the locking ring is provided with an outer bearing surface suitable for coming into contact with at least one first inner surface of the or each elastically deformable member while said member is passing between the first configuration and the second configuration, and vice versa, the outer bearing surface or the first inner surface being inclined towards a receiver mouth of the coupling element at an angle of inclination relative to the longitudinal axis lying in the range 30° to 60°, and preferably in the range 40° to 50°;

the body or the locking ring is provided with an abutment against which the safety ring comes to bear in the second configuration of the elastically-deformable member, the outer bearing surface being in contact with the first inner surface when the safety ring is in contact with the abutment;

the inner surface of the or each elastically-deformable member suitable for coming into contact with at least one of the radially-projecting portions while it is being inserted into the slot for connection, forms a ramp that is inclined in the opposite direction to the receiver mouth of the coupling element, the angle of inclination of the inner surface of the or each member relative to the longitudinal axis lying in the range 30° to 60°, and preferably in the range 40° to 50°;

the or each elastically-deformable member has an end that is received at least in part in the adjacent slot when the member is in the first configuration;

when the or each elastically-deformable member is in the first configuration, a maximum radius defined between the longitudinal axis and a radially-outer surface of the end of the or each elastically-deformable member is less than or equal to a maximum radius defined between the longitudinal axis and a radially-outer surface of the locking ring in register with the slot;

the locking ring has two guide surfaces for laterally guiding the elastically-deformable member;

the guide surface situated at the side of the slot opposite from the locking notch is inclined relative to a radial direction;

the guide surfaces are formed in register with a groove extending axially from a mouth of the slot;

the locking ring is mounted so as to be capable of turning around the body; and the safety ring is made of a synthetic material.

The invention also provides a coupling for releasably joining pipes, the coupling comprising a first coupling element and a second coupling element, the two coupling elements being suitable for engaging one within the other along a longitudinal coupling axis, one of the two elements being as described above.

BRIEF DESCRIPTION OF THE DRAWINGS

The invention can be better understood on reading the following description given purely by way of non-limiting example and made with reference to the accompanying drawings, in which:

FIG. 1 is a longitudinal section view of a male element and of a female element of a coupling of the present invention, in the disconnected state;

FIG. 2 is an end view of the coupling seen looking along arrow II of FIG. 1, with I-I in FIG. 2 showing the section plane of FIG. 1;

FIG. 3 is a longitudinal section view of the male element and of the female element while they are being connected together;

FIG. 4 is an end view of the coupling, seen looking along arrow IV in FIG. 3, with III-III in FIG. 4 showing the section plane of FIG. 3;

FIG. 9 is a perspective view of the male element of the coupling of FIGS. 1 to 8;

FIG. 10 is a perspective view of a safety ring of the female element of the coupling of FIGS. 1 to 8; and FIG. 11 is a perspective view of a locking ring of the female element of the coupling of FIGS. 1 to 8.

DESCRIPTION OF THE PREFERRED EMBODIMENTS

Figure 5:
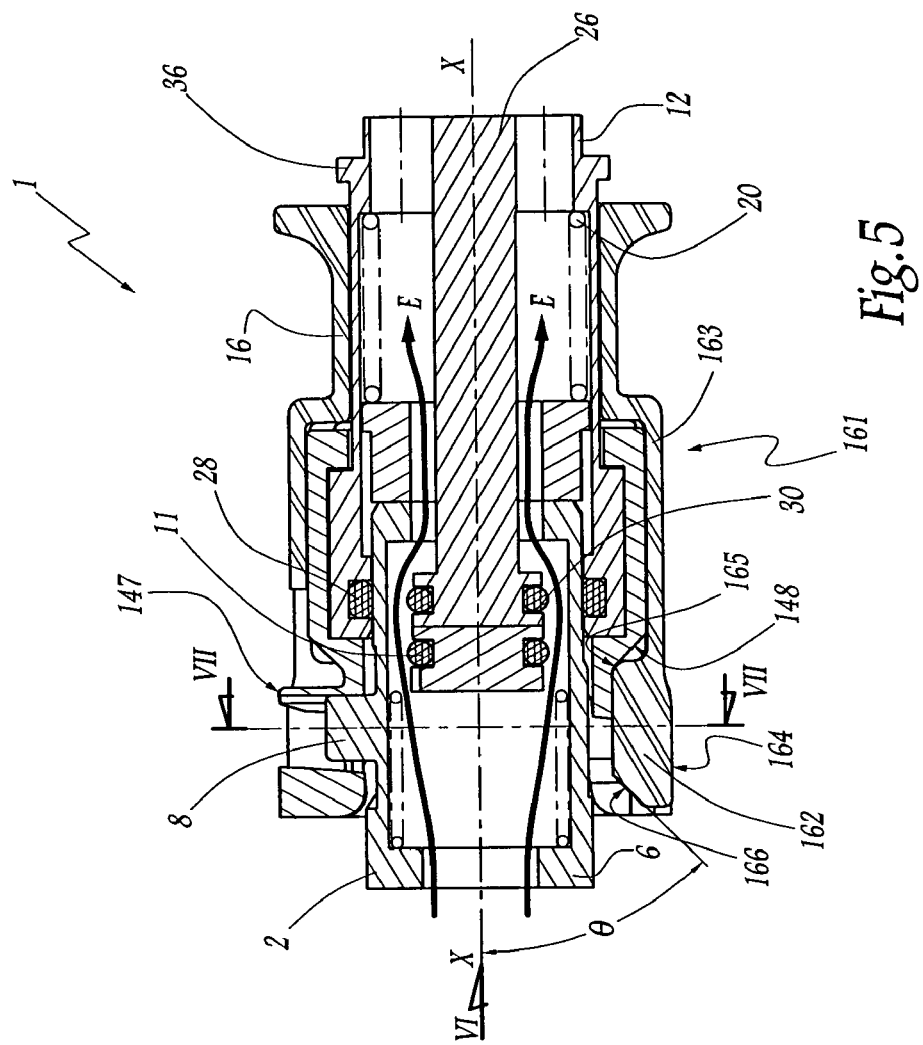
FIG. 5 is a longitudinal section view of the coupling with the male and female elements in the engaged position.
Figure 7:
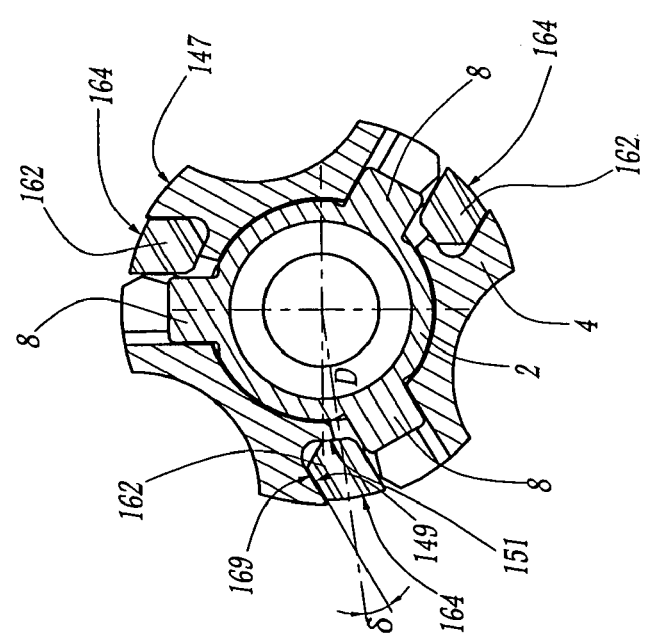
FIG. 7 is a section view on line VII-VII of FIG. 5.

FIGS. 1 to 11 show a bayonet coupling 1 comprising a male element 2 and a female element 4. Each of these two elements 2 and 4 is adapted for releasably joining two pipes. For this purpose, each of these two elements 2 and 4 has a rear portion in fluid flow connection with a respective pipe $C_1$ or $C_2$ shown in chain-dotted lines and only in FIG. 1 in order to clarify the drawings. The elements 2 and 4 are generally tubular and mutually complementary, such that they can be engaged one in the other along a longitudinal axis X-X that is common to these two elements.

The male element 2 comprises a generally tubular body 6 of circular section, and including three locking studs 8, each projecting radially outwards from the body 6. The three locking studs are regularly distributed around the periphery of the body 6. These studs are of cylindrical shape and they thus extend in radial directions $D_8$, forming between one another angles α of 120°, as shown in FIG. 2.

A valve member 7 is mounted in the body 6 and is resiliently biased by a spring 9 towards a seat 61 formed by the body 6 close to its front end 62. Furthermore, an O-ring 11 provides sealing between the valve member 7 and the body 6 when the valve member presses against the seat 61.

The female element 4 comprises a generally tubular body 12 of circular section having two circular section rings mounted thereabout, which rings overlap coaxially, i.e. an inner locking ring 14 and an outer safety ring 16, both centered on the axis X-X. The locking ring 14 is axially secured to the body 12. The safety ring 16 is placed in part around the locking ring 14.

The body 12 of the female element 4 defines an inner shoulder 18 against which a spring 20 bears to exert a resilient force on a valve member 22 so as to press it against a seat 24 that is formed in the body 12. The element 4 also has a pusher 26 that is stationary relative to the body 12 and that is in the form of an elongate rod centered on the axis X-X. When it bears against its seat 24, the valve member 22 lies radially between the pusher 26 and the body 12. Two O-rings 28 and 30 mounted respectively in the body 12 and on the pusher 26 then provide sealing when the element 4 is closed.

The locking and safety rings 14 and 16 of the female element 4 are suitable for turning together relative to the body 12 about the axis X-X.

The locking ring 14 has three grooves 141 that are regularly distributed about the axis X-X in such a manner as to be capable of simultaneously receiving the three locking studs 8 of the male element 2. Each slot 141 is open to the front of the locking ring 14, i.e. in its front face 142 that faces towards the element 2 in the configuration of FIG. 1. Each slot 141 extends over the entire radial thickness of the locking ring 14 from a mouth 143 formed in the face 142, with a curved shape that can be seen in FIG. 11. At its end opposite from the mouth 143, each slot 141 terminates in a locking notch 145. The locking ring 14 includes an abutment 140 limiting sliding of the safety ring 16 towards the front face 142 relative to the locking ring.

Each slot 141 is extended in a direction $D_{144}$ parallel to the axis X-X away from the mouth 143 by an axial groove 144 that is formed in a fraction only of the radial thickness of the locking ring 14, in the outside thereof. The locking notch 145 is laterally offset relative to the groove 144 and to the mouth 143.

The safety ring 16 has three elastically-deformable members or catches 161. Each member 161 is designed to be received in part in a groove 144 and in a slot 141 of the locking ring 14 in connected and disconnected configurations of the coupling.

Each member 161 has a bulky free end 162 for obstructing the passage between the locking notch 145 and the mouth 143 in a slot 141. It can be seen that the end 162 is set back relative to the front face 142. Thus, the stud 8 can engage in the slot 141 prior to coming into abutment against the end 162 of the member 161. Its second end, firmly secured to an annular portion 167 of the safety ring 16, is connected to the free end 162 via a longitudinal blade 163 of radial thickness $e_{163}$ that is smaller than the radial thickness $e_{162}$ of the end 162. The member 161 is preferably a catch that is elongate in the direction X-X so as to improve its flexibility and thus make it easier to deform when mechanical stresses are applied thereto.

Each catch 161 is formed integrally with the remaining portions of the safety ring 16.

The catches 161 are adapted so that the in connected and disconnected configurations, their portions 162 and 163 are received respectively in a slot 141 close to the mouth 143, and partially in the groove 144 that extends the slot.

In the disconnected configuration, the male and female elements 2 and 4 are separate, as shown in FIGS. 1 and 2. In order to connect them, the user moves the two elements 2 and 4 along arrows $F_1$ that extend parallel to the axis X-X. The coupling 1 is then brought into a "being-coupled" configuration as shown in FIGS. 3 and 4. Each locking stud 8 of the male element 2 is inserted simultaneously into the mouth 143 of one of the slots 141 of the locking ring 14. Under the effect of axial forces in the directions of the arrows $F_1$, each locking stud moves axially into the mouth 143 until it comes into abutment against the free end 162 of the catch 161. This abutment causes the free end 162 of the catch 161 to be deformed radially. This deformation is due to the resilient bending of the catch 161, and more particularly of its blade 163. This bending releases a radial space in which the stud 8 can pass.

Under the action of forces that continue to be applied in the directions of the arrows $F_1$, the locking studs 8 continue to advance along the slots 141 under the ends 162 until they engage in the locking notches 145.

When the studs 8 reach the notches 145 and are no longer axially facing the corresponding catches 161, the catches 161 return elastically to their initial configuration. Their respective free ends 162 come back into the slots 141. The adjacent studs 8 are no longer exerting any mechanical stress in radial and axial directions on the catches 161. This configuration of the catches 161 is shown in FIGS. 5 to 8 and corresponds substantially to the above-described configuration of the catches when the coupling 1 is in the disconnected state. In all positions of the catches 161, co-operation between the end 162 and the groove 144 serves to guide turning of the safety ring 16 relative to the locking ring 14.

Once each stud 8 is received in a notch 145, the coupling 1 is in the connected configuration as shown in FIGS. 5 to 8, in which configuration each catch 161 prevents the corresponding stud 8 escaping from the locking notch 145 in which the stud 8 is locked within the female element 4 against moving along the axis X-X. The valve members are both pushed back. Fluid can flow between the two pipes $C_1$ and $C_2$ that are connected to the male and female elements 2 and 4, as represented by arrows E in FIG. 5.

In addition, the locking ring 14 is provided with an outer bearing surface 148 in alignment with the mouth 143 of the groove 144 and in contact with a first inner surface 165 of the free end 162 of the catch 161. As shown in FIG. 3, when the male element 2 is engaging in the female element 4, with the stud 8 advancing along the slot 141, the catch 161 presses against portions of the outer bearing surface 148. The bulky free end 162 moves backwards and slides along the outer bearing surface 148, thereby contributing to the catch 161 deforming elastically in its blade 163. Advantageously, the outer bearing surface 148 slopes towards a receiver mouth 32 of the female element 4 that serves to receive the male element 2. Thus, the catch 161 is subjected to a smaller amount of stress in order to obtain the desired amount of bending. In addition, the angle of inclination P of the surface 148 relative to the longitudinal axis X-X lies in the range 30° to 60°, preferably in the range 40° to 50°, and more preferably is equal to 45°. An angle of inclination of 45° constitutes a good compromise for making it easier for the operator during a disconnection step both to move the free end 162 backwards and to retract the safety ring 16.

A second radially-inner surface 166 of the free end 162 comes into contact with the locking studs 8 when the studs 8 engage in the slot 141 for connection purposes, and this surface 166 forms a sloping ramp or chamfer at an angle of inclination θ relative to the longitudinal axis X-X that lies in the range 30° to 60°, preferably in the range 40° to 50°, and more preferably is equal to 45°. The ramp slopes in the opposite direction to the mouth 32. The presence of this chamfer enhances contact with the locking stud 8 and thus makes it easier for the catch 161 to deform radially under mechanical stress from the stud so as to make connection automatic.

Figure 6:
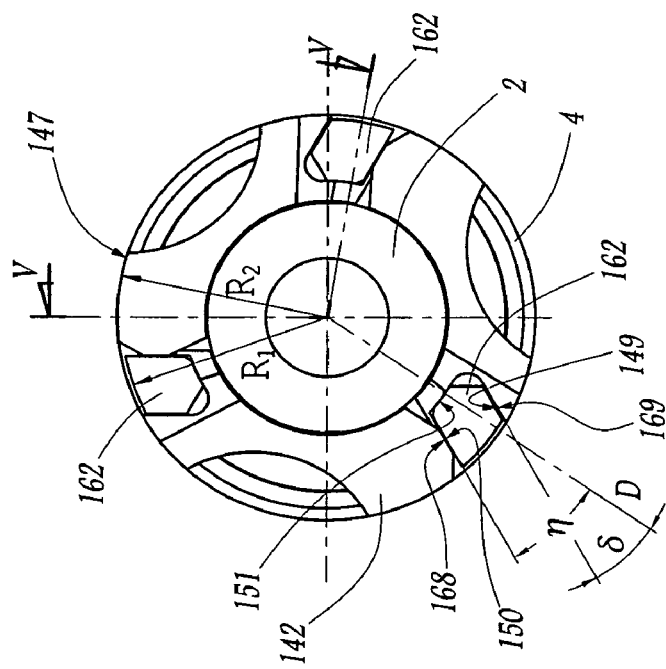
FIG. 6 is an end view of the coupling seen looking along arrow VI of FIG. 5, with V-V in FIG. 6 shown the section plane of FIG. 5.
Figure 8:
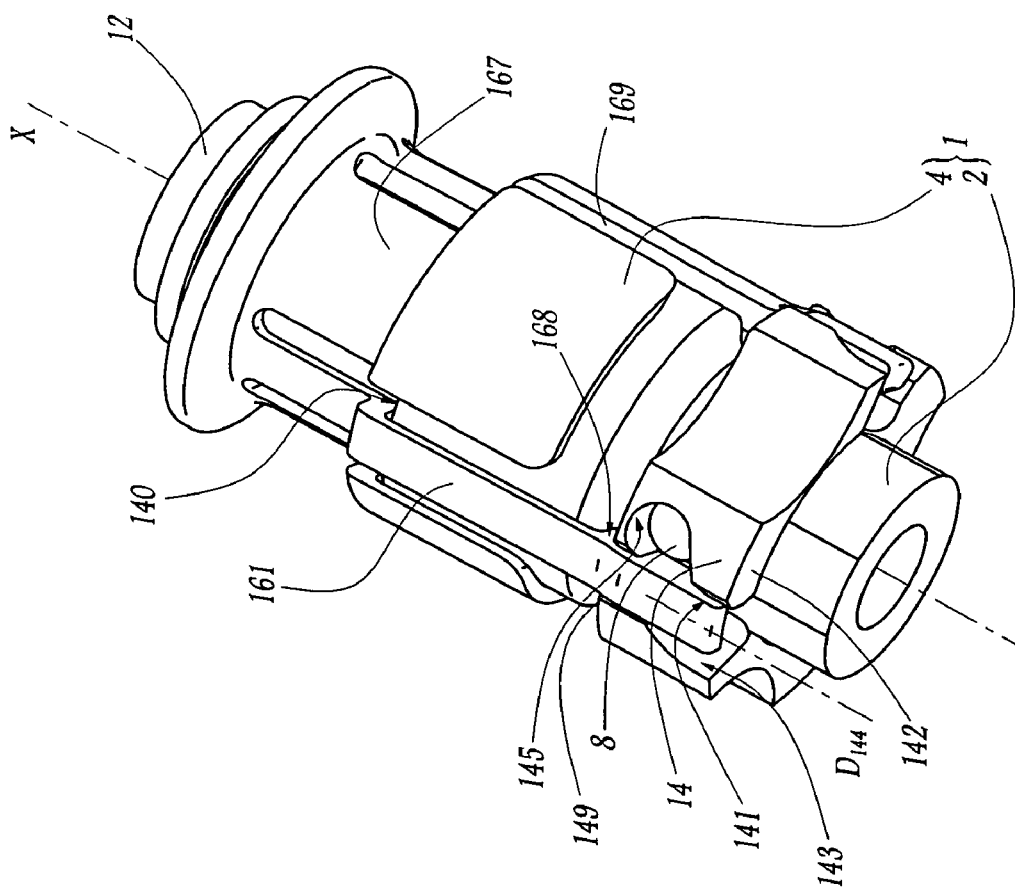
FIG. 8 is a perspective view of the coupling in the engaged position shown in FIGS. 5 to 7.

A radius $R_1$ defined between a radially-outer surface 164 of the free end 162 and the longitudinal axis X-X, when the coupling 1 is in the disconnected or connected state, is less than a radius $R_2$ defined between a radially-outer surface 147 of the locking ring 14 and the axis X-X. In this way, the free ends 162 of the catches 161, in the connected and disconnected positions, are protected by the locking ring 14 and do not run the risk of being damaged before they are used or while they are in use. As shown in FIGS. 2 and 6, the radial size of the safety ring 16 at the ends 162 is less than the radial size of the locking ring 14.

Furthermore, the body 12 is provided with an outer annular collar 36 disposed at its periphery on a portion opposite from the mouth 32. As shown in FIG. 3, while connection is taking place, the safety ring 16 can move backwards relative to the body 12 until it comes to bear against the collar 36. This collar 36 thus forms an abutment that serves to ensure that the outer bearing surface 148 is in contact with the end 162 of the catch 161 when the safety ring 16 is moved backwards as far as possible. Thus, return of the catch 161 towards the connected and disconnected positions is automatic and therefore guaranteed.

In a variant that is not shown, the collar 36 may be provided on the locking ring 14.

The safety ring 16 may be made of synthetic material. In addition to reducing the weight of the safety ring, the use of such a material enables complex shapes to be obtained, in particular by thermoforming.

Advantageously, the side surfaces 168 and 169 of a catch 161 are parallel to the axis X-X. These side surfaces 168 and 169 are parallel to the sides 149 and 150 of the groove 144 along which they extend in part. The sides 149 and 150 form receiver surfaces for receiving the side surfaces 169 and 168 of the catches 161 with which they are respectively parallel. As shown in FIGS. 2, 4, and 6, the side surfaces 169 and the sides 149 that are situated at the side of the slot 141 that is opposite from the notch slope with the same angle δ relative to a radial direction D passing through the middle of the bottom 151 of a groove 144, i.e. halfway between the sides 149 and 150 in register with the bottom. The surfaces 169 and the sides 149 slope towards the notch 145 on going away from the axis X-X. The surfaces 168 and the sides 150 also slope relative to the direction D at an angle η. The surfaces 168 and 169 and the sides 149 and 150 are respectively mutually parallel, such that the angles δ and η have the same value. In a variant, these angles may be defined so that η is greater than δ so that deformation of the catch 161 can take place. The surfaces 168 and the sides 150 slope towards the notch 145 going away from the axis X-X.

Under such circumstances, deformation continues to be said to be radial even though the deformation of the catch 161 follows the direction of the inclination of the sides 149 and 150 of the groove 144, in other words the deformation is radial, at least in part.

When a stud 8 is received in a notch 145 and the stud 8 tends to be expelled from the notch, the stud comes to bear against the side surface 168 of the adjacent catch 161 in the end portion 162 thereof. The catch 161 is in no danger of deforming sideways to any significant extent since its side surface 169 then comes to bear against the side 149 of the groove 144. The side 149 thus forms an abutment preventing sideways deformation of the catch 161. The inclination of the surface 169 and of the side 149 at the angle δ contributes to the desired blocking effect. In this way, the locking stud 8 is well held in the corresponding notch 145 when the coupling is in the connected state. Any force exerted by the stud 8 cannot cause the catch 161 to bend. Locking safety is thus reinforced.

To disconnect the male and female elements 2 and 4, an operator pulls the safety ring 16, and more precisely the annular portion 167, towards the pipe $C_2$ until it comes into abutment against the collar 36. The end 162 of the catch 161 then slides via its surface 165 over the surface 148, thereby causing the catch 161 to deform radially. The end 162 releases a passage for the adjacent locking stud 8. The stud 8 can then disengage from the locking notch 145 and move towards the mouth 143 of the slot 141. Because of the forces exerted by the valve member 22 on the body 6, the stud 8 then disengages from the adjacent locking slot 141. The angle of inclination β, which is preferably equal to 45°, enables the operator to perform a single movement on the safety ring 16 in order to cause the ends 162 to bend.

When the operator lets go the safety ring 16 of the disconnected female element 4, the deformed catches 161 return forwards, into their disconnected configuration as shown in FIG. 2, in which they obstruct the passages for the studs 8 between the mouths 143 and the notches 145, and the coupling is ready for a further automatic connection operation.

In a variant of the invention that is not shown, the number of locking studs 8 is not necessarily equal to three. A male element may be provided that has at least one locking stud. If the male element has at least two locking studs, it is advantageous for them to be regularly distributed around the periphery of the surface of the element from which they project. The number and the spatial distribution of the slots 141, the notches 145, and the catches 161 match the number and the distribution of the studs 8.

In addition, each locking stud 8 need not be formed integrally with the body 6, but could be fitted to said body and secured by any appropriate means, such as adhesive or heat-sealing, for example. Furthermore, each locking stud is not necessarily cylindrical.

In another variant, the inner surface 165 is inclined, preferably at an angle of 45°, instead of and replacing the outer bearing surface 148, with the orientation of the inclination of the inner surface 165 being identical to that described for the outer bearing surface 148.

Furthermore, the catches 161 are not necessarily integral with the annular portion 167.

Provision can also be made for the locking ring 14 to be prevented from moving in rotation and in translation relative to the body 12, such that once the two coupling elements have been connected together, it is no longer possible for there to be any relative rotation between these two elements.

In a variant that is not shown, provision can be made for a locking notch to have a shape that enables the stud 8 to be locked axially in the female element. By way of example, the notch may be formed with sides that are perpendicular to the axis X-X. In this variant, the catch 161 does not serve to lock the stud axially in the locking notch, but serves to hold the stud in the notch in the event of relative movement between the two elements of the coupling.

The invention claimed is:

1. A female coupling element for releasably joining pipes, the female coupling element receiving a male element along a longitudinal axis of the female coupling element, the female coupling element comprising:
    a body;
    a locking ring secured in translation relative to the body and provided with at least one slot for receiving at least one radially projecting portion of the male element, and at least one locking notch for receiving the at least one radially projecting portion in a configuration in which the at least one radially projecting portion is locked axially along the longitudinal axis;
    a safety ring superposed, at least in part, on the locking ring; and
    wherein the safety ring includes at least one elastically deformable member that is radially deformable between a first configuration in which the at least one elastically deformable member prevents the at least one radially projecting portion of the male element from moving out of the locking notch, and a second configuration in which the at least one elastically deformable member allows the at least one radially projecting portion to move from the locking notch.

2. The coupling element according to claim 1, wherein the safety ring is mounted to slide around the locking ring, the locking ring is provided with an outer bearing surface which contacts at least one first inner surface of the at least one elastically deformable member while the at least one elastically deformable member is passing between the first configuration and the second configuration, and vice versa, and one of the outer bearing surface and the first inner surface being inclined towards a receiver mouth of the female coupling element at an angle of inclination (β) relative to the longitudinal axis in a range of 30° to 60°.

3. The coupling element according to claim 2, wherein one of the body and the locking ring includes an abutment against which the safety ring bears in the second configuration of the at least one elastically deformable member, the outer bearing surface being in contact with the first inner surface when the safety ring is in contact with the abutment.

4. The female coupling element of claim 2 wherein the angle of inclination (β) is in a range of 40° to 50°.

5. The coupling element according to claim 1 wherein the inner surface of the at least one elastically deformable member contacts the at least one radially projecting portion while it is being inserted into the slot for connection forms a ramp that is inclined in a direction opposite to the receiver mouth of the female coupling element, an angle of inclination (θ) of the ramp formed by the inner surface of the at least one elastically deformable member relative to the longitudinal axis is within a range of 30° to 60°.

6. The female coupling element of claim 5 wherein the angle of inclination (θ) is in a range of 40° to 50°.

7. The coupling element according to claim 1, wherein the at least one elastically deformable member has an end that is received, at least in part, in the slot when the at least one elastically deformable member is in the first configuration.

8. The coupling element according to claim 7, wherein, when the at least one elastically deformable member is in the first configuration, a maximum radius ($R_1$) defined between the longitudinal axis and a radially outer surface of the end of the at least one elastically deformable member is less than or equal to a maximum radius ($R_2$) defined between the longitudinal axis and a radially outer surface of the locking ring in register with the slot.

9. The coupling element according to claim 1, wherein the locking ring has two guide surfaces for laterally guiding the at least one elastically deformable member.

10. The coupling element according to claim 9, wherein the guide surface situated at a side of the slot opposite from the locking notch is inclined relative to a radial direction.

11. The coupling element according to claim 9, wherein the guide surfaces are formed in register with a groove extending axially from a mouth of the slot.

12. The coupling element according to claim 1, wherein the locking ring is mounted so as turn around the body.

13. The coupling element according to claim 1, wherein the safety ring is made of a synthetic material.

14. A coupling for releasably joining pipes, the coupling comprising a first coupling element and a second coupling element, the two coupling elements being engageable one within the other along a longitudinal coupling axis thereof, wherein one of the two elements is an element according to claim 1.

15. The female coupling element of claim 1 wherein the male element includes a plurality of radially projecting portions, the locking ring including a plurality of slots for receiving the plurality of radially projecting portions which slots open to a plurality of locking notches for receiving the plurality of radially projecting portions in a configuration wherein the radially projecting portions are locked to the locking ring, and the safety ring including a plurality of elastically deformable members.

* * * * *